(12) United States Patent
Yanacek et al.

(10) Patent No.: US 9,262,505 B2
(45) Date of Patent: Feb. 16, 2016

(54) INPUT-OUTPUT PRIORITIZATION FOR DATABASE WORKLOAD

(71) Applicant: Amazon Technologies, Inc., Reno, NV (US)

(72) Inventors: David Craig Yanacek, Seattle, WA (US); Bjorn Patrick Swift, Seattle, WA (US); Wei Xiao, Kirkland, WA (US); Kiran-Kumar Muniswamy-Reddy, Seattle, WA (US); Miguel Mascarenhas Filipe, Seattle, WA (US); Yijun Lu, Kenmore, WA (US)

(73) Assignee: Amazon Technologies, Inc., Reno, NV (US)

( * ) Notice: Subject to any disclaimer, the term of this patent is extended or adjusted under 35 U.S.C. 154(b) by 84 days.

(21) Appl. No.: 13/897,232

(22) Filed: May 17, 2013

(65) Prior Publication Data

US 2014/0344312 A1    Nov. 20, 2014

(51) Int. Cl.
*G06F 17/30*    (2006.01)

(52) U.S. Cl.
CPC .................... *G06F 17/30595* (2013.01)

(58) Field of Classification Search
USPC .......................................................... 707/790
See application file for complete search history.

(56) References Cited

U.S. PATENT DOCUMENTS

| | | | |
|---|---|---|---|
| 6,094,654 A | 7/2000 | Van Huben | |
| 7,406,399 B2 * | 7/2008 | Furem | E02F 9/26 37/379 |
| 7,689,394 B2 * | 3/2010 | Furem | E02F 9/267 703/8 |
| 7,979,183 B2 * | 7/2011 | Toda | E02F 9/2246 701/50 |
| 8,195,832 B2 * | 6/2012 | Nam | H04L 45/742 370/254 |
| 8,201,350 B2 * | 6/2012 | Folkerts | E02F 3/40 37/379 |
| 8,246,283 B2 * | 8/2012 | Fujita | C10B 33/00 414/154 |
| 8,335,123 B2 * | 12/2012 | Sprouse | G11C 16/30 365/185.03 |
| 8,422,396 B2 * | 4/2013 | Shimizu | H04L 43/0894 370/253 |
| 2010/0183304 A1 | 7/2010 | Spector | |
| 2011/0246481 A1 | 10/2011 | Narayanan et al. | |
| 2012/0192141 A1 * | 7/2012 | Clemm | G06F 8/71 717/101 |

FOREIGN PATENT DOCUMENTS

WO    WO 2008/121690 A1    10/2008

OTHER PUBLICATIONS

International Patent Application No. PCT/US2014/38477; International Search Report and the Written Opinion; dated Oct. 2, 2014, 8 pages.
International Patent Application No. PCT/US2014/038477; Int'l Preliminary Report on Patentability; dated Nov. 26, 2015; 7 pages.

* cited by examiner

*Primary Examiner* — Kim Nguyen
(74) *Attorney, Agent, or Firm* — Baker & Hostetler LLP

(57) ABSTRACT

A database management system may be operated by a third-party provider that hosts the system in a datacenter and provides access to the system to end users on behalf of various entities. Limits on total capacity consumption may be imposed, but may result in service outages when capacity consumption exceeds those limits. Requests to perform operations on the system may be classified. The request classifications may be associated with policies for admitting or rejecting the request. One or more token buckets representative of capacity available to the request to perform the operation may be used to determine to admit the request and updated based on the cost of performing the operation.

27 Claims, 16 Drawing Sheets

INPUT-OUTPUT PRIORITIZATION FOR DATABASE WORKLOAD

BACKGROUND

Database management systems ("DBMS") may be operated by a third-party provider that hosts the DBMS on servers in a datacenter and provides the DBMS as a service to various entities such as corporations, universities, government agencies, and other types of customers. In order to host the DBMS and provide the service to the various entities, the provider typically maintains significant resources in hardware, software, and infrastructure. In addition, the provider may incur various ongoing costs related to operating the DBMS such as power, maintenance costs and the salaries of technical personnel. Accordingly, in order to provide a responsive service to the various entities, the provider may attempt to maximize the capacity and utilization of the hardware and other resources installed at its data centers.

BRIEF DESCRIPTION OF DRAWINGS

The drawings provided herein are designed to illustrate example embodiments and are not intended to limit the scope of the disclosure.

FIG. 4 is a diagram depicting dividing request types into a plurality of request classes and associating the classes with admittance policies that may control which token bucket determines admittance and which bucket or buckets tokens are withdrawn from.

DETAILED DESCRIPTION

Figure 1:
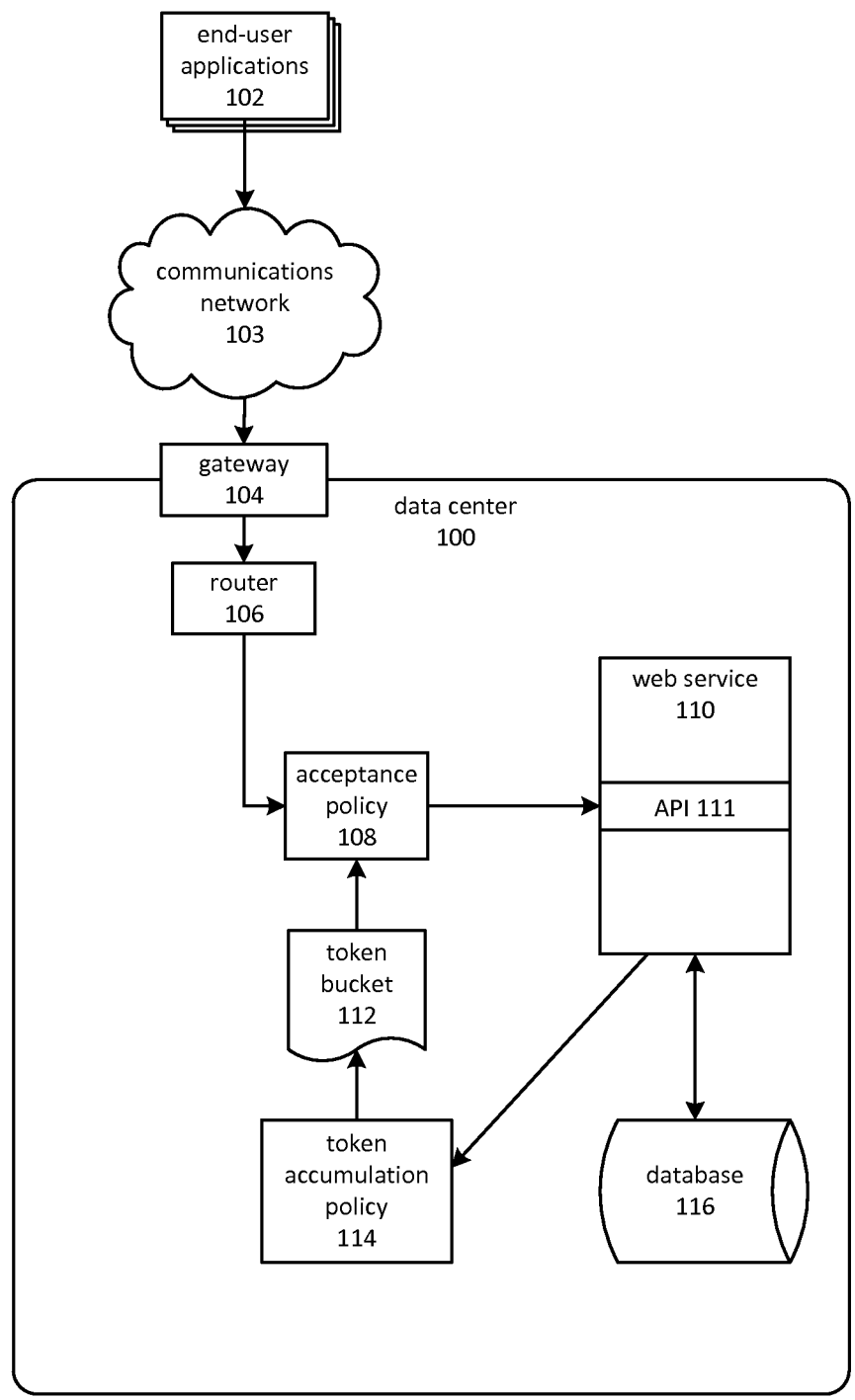
FIG. 1 is a block diagram depicting a database management system exposed to end-users through a web service and limiting capacity consumption through the use of a token allocation and consumption mechanism.

As noted above, a provider may host a DBMS in a datacenter and provide access to the DBMS as a service to various entities. In that regard, the DBMS may be exposed through a web service, a web application, a remote procedure call and so forth. These mechanisms and others may be referred to herein as services. In some embodiments, a DBMS may provide an integrated front-end that exposes one or more of the services to end users of the entities or customers. Through the services, the end users may make requests that include various operations and queries to be performed on the DBMS through the use of application programming interface ("API") calls to the service. A request may comprise, for example, an invocation of an API on behalf of a customer, as well as an invocation of an operation on a DBMS on behalf of a customer.

The provider may also require payment from a customer in exchange for the use of this capacity. However, the profitability of the endeavor may depend on a customer paying an amount that is proportional to the capacity consumed on its behalf. A limit on capacity consumption may be imposed on a customer and enforced through various techniques such as throttling, queuing, and so forth. When usage exceeds the amount provisioned to the customer, requests for services on behalf of a customer may be rejected or suspended. This may be disadvantageous to the customer in a variety of circumstances. For example, the service may be a component of an e-commerce web site or similar application which may become non-functional if requests for the service are rejected. However, it may be that not all requests for services are equally important to the customer. While various requests such as displaying the contents of an e-commerce shopping cart or processing a customer order may be of high importance, others may not. For example, certain types of requests with low relative importance may include maintenance tasks, report generation, data mining and so forth. These tasks may also happen to consume a relatively large portion of capacity, and are therefore more likely to cause outages, blackout periods, or delays caused when a customer's provisioned capacity has been exceeded.

An end user may invoke operation on the DBMSs by sending a request including an identifier of the operation and one or more parameters. Any number of operations may be identified, and may include operations such as reading or writing data, performing queries on data, and various data definition and schema-related instructions such as creating and deleting tables. The parameters that may be included with the request may be any type, such as textual values, enumerated values, integers and so forth. The particular combination of parameters will vary based on the type of operation being invoked.

A DBMS is a software and hardware system for maintaining an organized collection of data. In a DBMS, data is typically organized by associations between key values and additional data. The nature of the associations may be based on real-world relationships that exist in the collection of data, or it may be arbitrary. Various operations may be performed by a DBMS, including data definition, queries, updates, and administration. Some DBMSs provide for interaction with the database using query languages such as structured query language ("SQL"), while others use APIs containing operations such as put( ) and get( ) and so forth. Interaction with the database may also be based on various protocols or standards, such as hypertext markup language ("HTML") and extended markup language ("XML"). A DBMS may comprise various architectural components, such as a storage engine that acts to store data one on or more storage devices such as solid-state drives.

The provider may host any number of DBMSs within its datacenters. The DBMSs may operate on any number of computing nodes and may be associated with various storage devices and connected using a wide variety of networking equipment and topologies. Moreover, a variety of DBMSs may be hosted, including relational databases, object-oriented databases, no-structured query language ("NoSQL") databases and so forth.

As noted above, a limit on capacity consumption may be imposed on a customer. In embodiments, a customer may have a set level of capacity consumption. The customer's level of capacity consumption may be limited through various estimation and measurement techniques. Because of the wide variety of computing resources that may be involved in processing a request, capacity consumption may be difficult to determine. However, various measurable quantities may serve as reasonable proxies for capacity consumption. In various embodiments, quantities such as the amount of data sent to or received from a client application may be employed to estimate the capacity consumed by processing a certain request. For example, a query request may scan a database table in order to determine rows that conform to the constraints specified in the query. The number of rows returned may be a proxy for capacity consumption. For example, if a single row of data is returned, the query may have been limited in scope and, therefore, is likely to have consumed less capacity than a query that resulted in many rows of data being returned. More details of example embodiments are described below in connection with the figures.

As noted above, in an example embodiment a provider hosts one or more DBMSs within a data center and provides access to the various DBMSs through a web service. FIG. 1 depicts an environment for hosting provisioned web services and databases within a data center. End-user applications 102 may be connected to elements within data center 100 by communications network 103, gateway 104, and router 106. Those of ordinary skill in the art will recognize that this network configuration is one of many possible configurations that may be incorporated into embodiments of the present disclosure.

Web service 110 may provide various APIs that provide functions related to the operation of database 116. In some cases, the APIs may serve as light-weight wrappers built on top of more complex database interfaces or protocols. For example, depicted API 111 might provide access to a query function of database 116 through use of an interface adhering to representational state transfer ("REST") principles. End-user applications 102 may then invoke API 111, using comparatively simple REST semantics, to query a key-value database without needing to understand the technical details of database 116.

Web service 110 and database 116 may operate on a variety of platforms such as one or more computers, virtual machines or other forms of computing services which may collectively be referred to as computing nodes. Operation of these nodes, as well as associated storage devices, network infrastructure and so forth, involves various costs. These costs include those related to hardware and software acquisition, maintenance, power, personnel and so forth. The costs may also include factors such as opportunity cost incurred when consumption of resources by one customer prevents utilization of the service by another.

Operations performed by web service 110 and database 116 on behalf of a customer may be correlated to consumption of an amount of capacity on a given computing node. The correlation may allow a hosting service provider to calculate the costs incurred by providing the service. For example, if a given customer invokes a web service that utilizes one-hundred percent of a computing node's capacity over an entire day, the cost of providing the service may be the sum of acquisition, maintenance and operating costs for the computing node prorated for a twenty-four hour period.

Accordingly, consumption of capacity may be limited through various means such as the embodiment depicted in FIG. 1. Acceptance policy 108 involves determining whether or not a request should be processed. In general terms, a goal of acceptance policy 108 may be to ensure that requests performed on behalf of a customer are not permitted to exceed a provisioned amount of capacity. For example, a customer may be provisioned twenty-five percent of a computing node's capacity. Acceptance policy 108 may then act to limit that customer's average consumption of capacity to no more than twenty-five percent. In some embodiments peak usage may be permitted to rise above that amount for a limited period of time.

When a customer's capacity has been overused, acceptance policy 108 may reject incoming requests. Depending on the nature of the request, this may have consequences that are important to the customer. For example, a customer might run a shopping web site which directs requests to database 116 to retrieve the contents of an end user's shopping cart. If the request is rejected, an error message rather than a completed sale might result. On the other hand, some types of requests can be postponed without significant consequences. Possible examples include maintenance tasks, report generation and so forth. Accordingly, acceptance policy 108 may be implemented to account for the type of request being invoked when making admit or reject decisions.

Embodiments may employ a token bucket model to limit capacity consumption. A token bucket may be seen conceptually as a collection of tokens, each of which represents a unit of work that the owner of the bucket is authorized to perform. Tokens may be added to a bucket at an accumulation rate, which may for example be based on a level of service. When work is performed, a number of tokens equivalent to the amount of work performed is withdrawn from the bucket. If no tokens are available, the work may not be performed. Using this approach, over time the amount of work that may be performed is limited by the rate at which tokens are added to the bucket.

In order to prevent near-term over-utilization of capacity, a limit may be imposed on the maximum number of tokens that may be added to the bucket. Any tokens to be added above that limit may be discarded.

In the context of a database operation, a token may be considered to represent a unit of cost related to performing the database operation. For example, the cost of a request to perform an operation on database 116 might correspond to the size of data returned when the operation is executed. The cost of performing the operation, as measured in tokens, may be determined by dividing the size of the data by a size per token value.

A requested operation may be deemed to cost at least one token, but the full cost may not be known until after the operation has actually been performed. In one embodiment, among many possible embodiments, a request may be admitted when at least one token is available. The request may then be processed and the total cost of the request determined based on one or more measured quantities.

In FIG. 1, tokens may accumulate in a virtual container such as a token bucket 112. The token bucket may be considered to represent an association between units of permitted capacity consumption, represented by tokens, and an entity such as a customer or service. For example, when a customer creates a table on database 116, token bucket 112 may be associated with all operations performed on that table. Other embodiments might associate a token bucket with a table partition, customer, computing node and so forth.

Token accumulation policy 114 may govern the addition of tokens into token bucket 112. In an embodiment, accumulation policy 114 comprises a rate of addition and a maximum token capacity. For example, a policy might indicate that a given bucket should accumulate tokens at a rate of twenty per second but that no more than one hundred tokens should be allowed to accumulate.

Tokens and token buckets may be represented by various structures. In an embodiment, acceptance policy 108, token bucket 112 and token accumulation policy 114 are implemented by a module of functionality, such as a software library, executable program and so forth. The module may represent tokens and token accumulation by recording a current number of tokens, a maximum number of tokens, a rate of accumulation and a last token addition time. When determining whether or not to admit or reject the request, the module may first update the current number of tokens based on the rate of accumulation, the last time tokens were added and the current time. For example, when a data structure corresponding to a token bucket is examined to determine if capacity is available, the number of new tokens accumulated may be determined by multiplying the rate of accumulation by the amount of time that has elapsed since the last update to the count of available tokens. This value may be added to the count of currently available tokens, but not allowed to exceed the maximum number of tokens allowed in the bucket. Other techniques for maintaining the token bucket, such as those based on a periodically invoked routine, are also possible.

Figure 2:
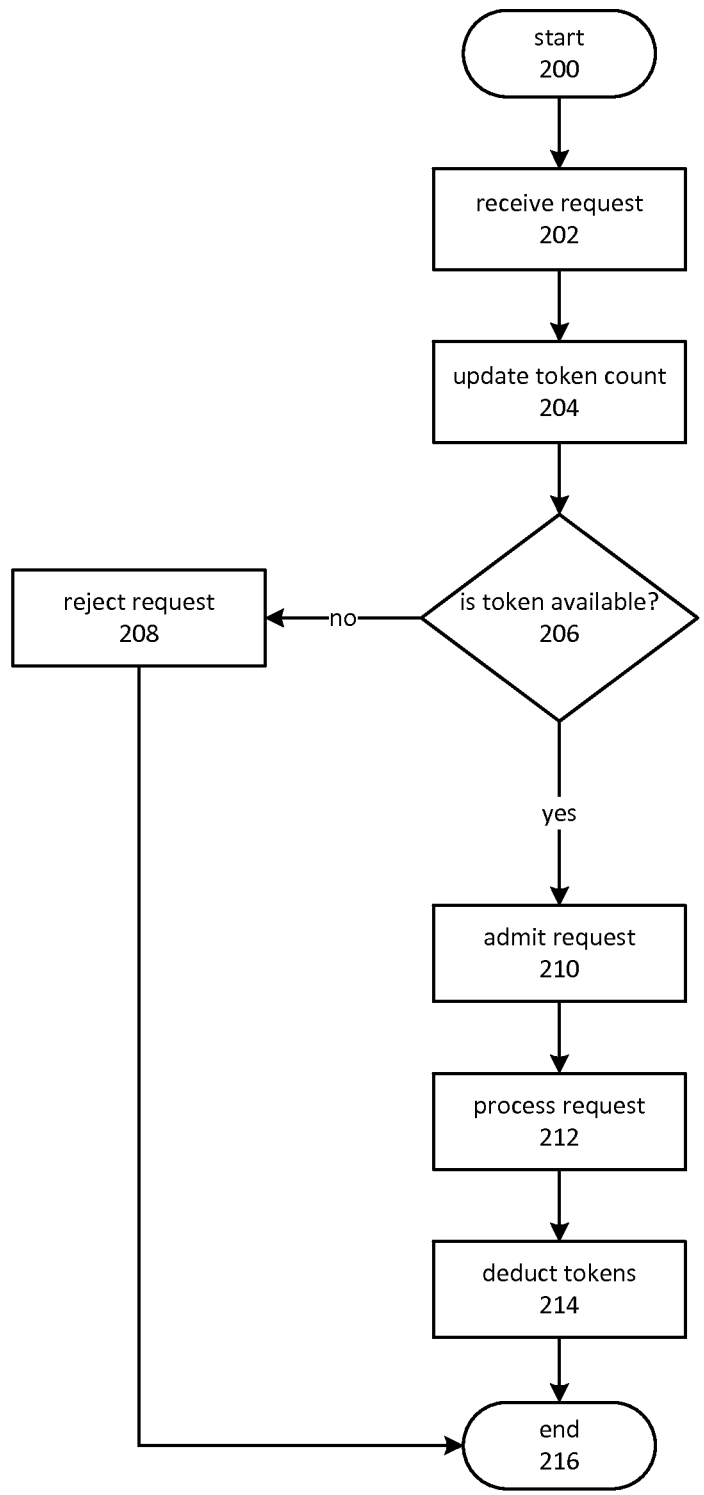
FIG. 2 is a flowchart depicting enforcement of a provisioned capacity using a token allocation and consumption mechanism.

FIG. 2 depicts an embodiment of applying acceptance and token accumulation policies. Although depicted as a sequence of operations starting at operation 200 and ending with operation 216, those of ordinary skill in the art will appreciate that the operations depicted are intended to be illustrative of an embodiment and that at least some of the depicted operations may be altered, omitted, reordered or performed in parallel.

At operation 202, a request to perform a service is received. As an example, the request might comprise a database query. The cost of the database query may be determined based upon the amount of data returned by performing the query, possibly measured by the number of bytes of data returned to the end user.

Operation 204 depicts updating the count of available tokens. In an embodiment, the number of available tokens may be adjusted based on a last update time, a token accumulation rate and the current time. The maximum number of available tokens may also be limited. When a request is admitted, a token is deducted from the current count of tokens. However, because various embodiments may allow the current token count to fall below zero, it may be the case that no tokens are available for deduction. Operation 206 depicts determining if a token is available for deduction. Some embodiments may consider one token to be sufficient to admit the request, while others may attempt to estimate the number of tokens, i.e. the capacity, processing the request will consume. As used herein, the terms sufficient tokens or sufficient capacity may refer to one token, a fixed number of tokens, a number of tokens based on an estimate of capacity that will be utilized by processing a request and so forth. If insufficient tokens are available, the request is rejected as depicted by operation 208. A client application and/or the customer of the hosting service may be notified of the rejection.

Operation 210 depicts admitting a request when at least one token is available. The count of available tokens may be reduced by one and the request is processed, as depicted by operation 212. Once the request has been processed, the number of available tokens may be adjusted further downward, as depicted by operation 214, based on the actual cost of performing the request. In various embodiments, the actual cost may be measured based on metrics such as the amount of data returned, CPU utilization, memory consumption, network bandwidth consumption and so forth.

The embodiment depicted by FIG. 2 may allow the count of tokens currently in a bucket to fall below zero. A negative token balance may correspond to a blackout period during which no requests that depend upon that token bucket may be admitted. The length of the blackout period can depend upon the current negative token count and the rate of token accumulation. For example, if the token accumulation rate is ten per second, and the number of available tokens is −100, the length of the blackout period may be ten seconds.

Figure 3A:
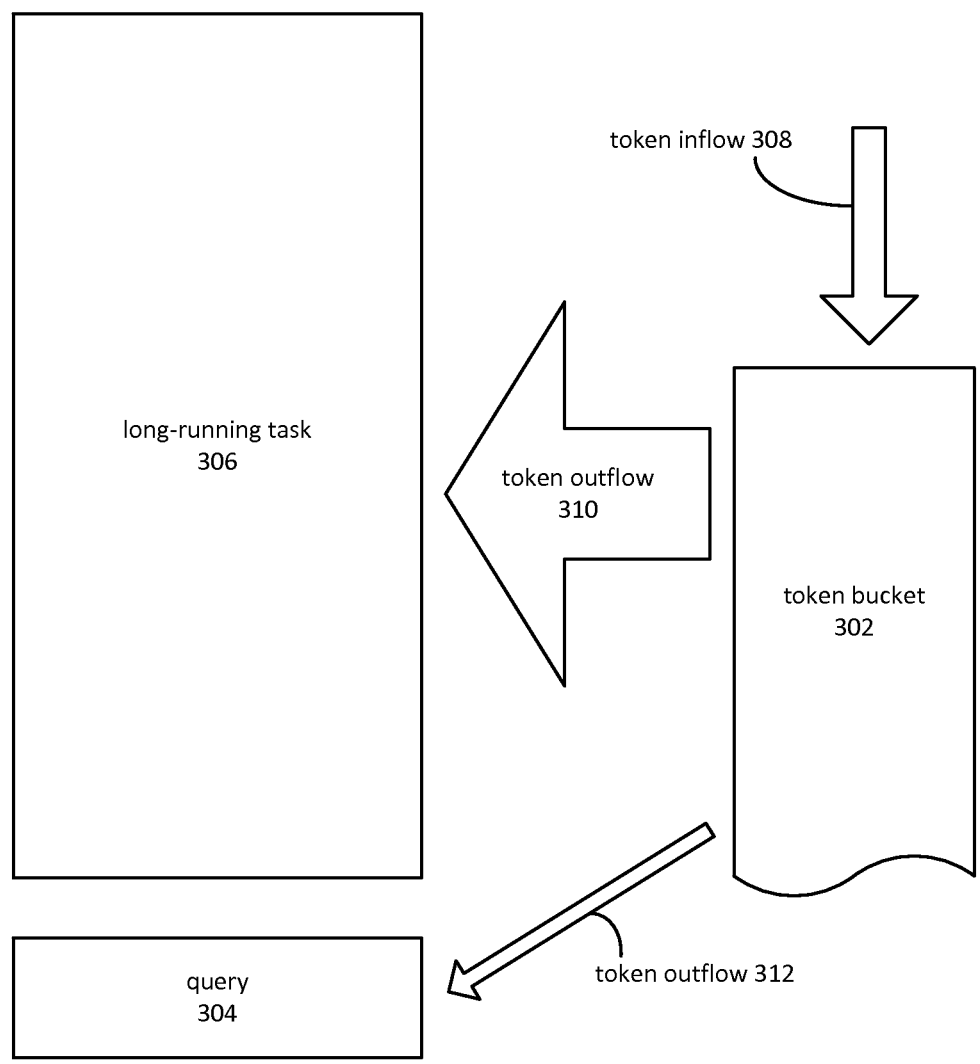
FIG. 3A is a diagram depicting allocation of tokens to a token bucket and multiple request types consuming tokens from the token bucket.

Certain types of requests, such as those involving maintenance, reporting, summarization and so forth may be data intensive and treated as high-cost. These types of request may therefore cause lengthy blackout periods, during which any request, including those of low cost but high importance, may be unable to run. FIG. 3A depicts an example of this type of situation. The total provisioned capacity allocated to a particular entity, such as a table, partition, computing node and so forth may be represented by token inflow 308, the rate at which tokens are added to token bucket 302. For example, long-running maintenance task 306 may be a data-intensive task that causes a comparatively large amount of token outflow 310. It may be the case that each time the task is run, the number of available tokens in token bucket 302 drops to a negative number and a blackout period ensues. On the other hand, a query request 304 may require little data outflow and cause a comparatively small amount of token outflow 312. However, a previously executed maintenance task may have caused a blackout period, and the query requests may be rejected despite their low cost. It may be advantageous to avoid such situations.

Figure 3B:
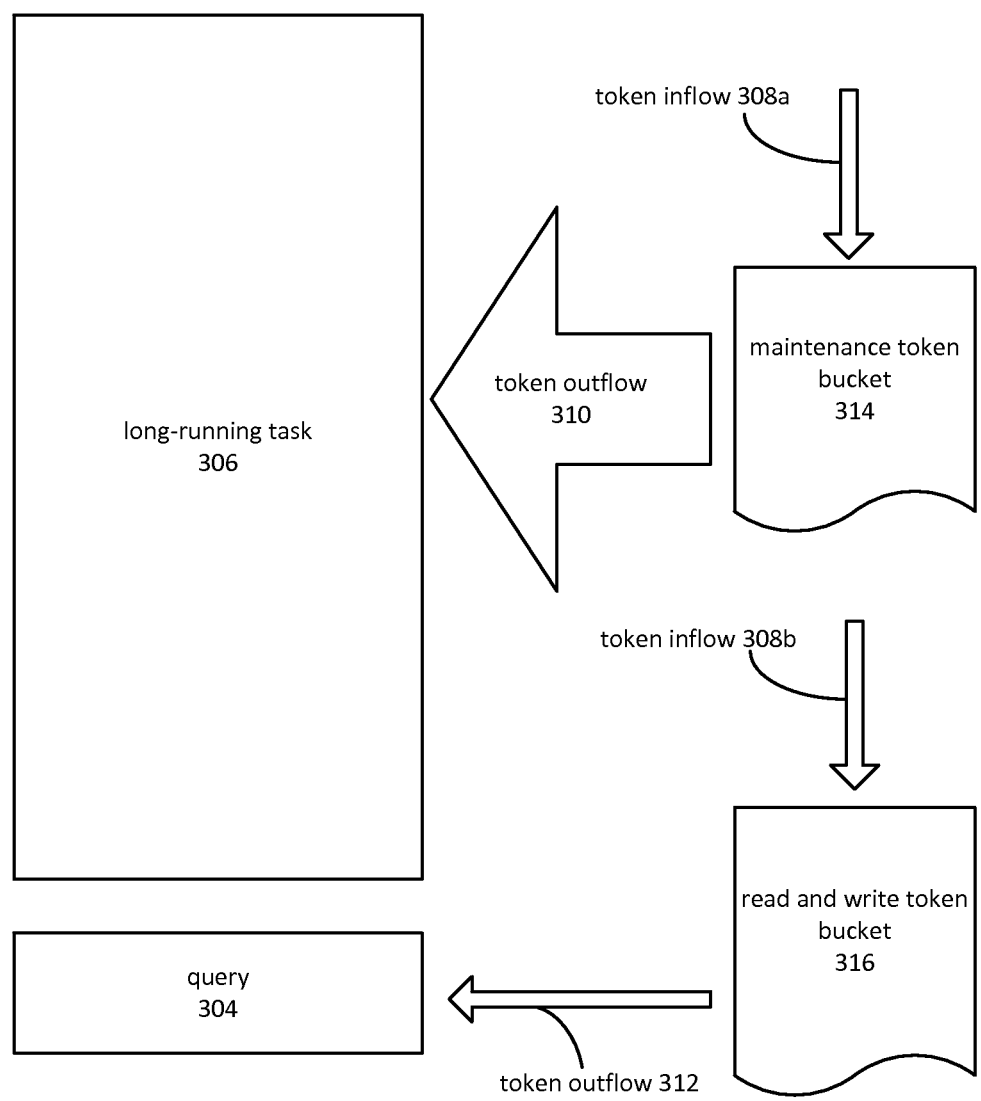
FIG. 3B is a diagram depicting allocating tokens to multiple token buckets that are categorized according to request type and withdrawing tokens from the buckets based on processing a corresponding request type.

FIG. 3B depicts dividing provisioned capacity into two separate token buckets 314 and 316. Token inflow is divided equally as depicted by token inflow 308a and token inflow 308b. The cost of performing the long-running maintenance tasks and the queries remains constant, and thus token outflow rates 310 and 312 remain unchanged. This arrangement prevents query requests from being blocked by executing a long-running maintenance task. However, it may be the case that the maintenance task is rarely called. If so, much of the capacity reserved to the long-running task may be wasted.

Request admittance may be determined based on more than one bucket, and for tokens to be deductible from more than one bucket. For example, an embodiment might divide request types into high, medium and low priorities. A high priority request might be able to withdraw from any bucket, the medium request from two of the three buckets, and the low priority request from only one. Categories of similar request types may be described as classes. These classes may then be associated with an admittance policy. The admittance policy may comprise an indication of which token buckets should be used to determine whether or not a request should be admitted, and a technique or approach for withdrawing tokens once the total cost of the request is known.

Figure 4:
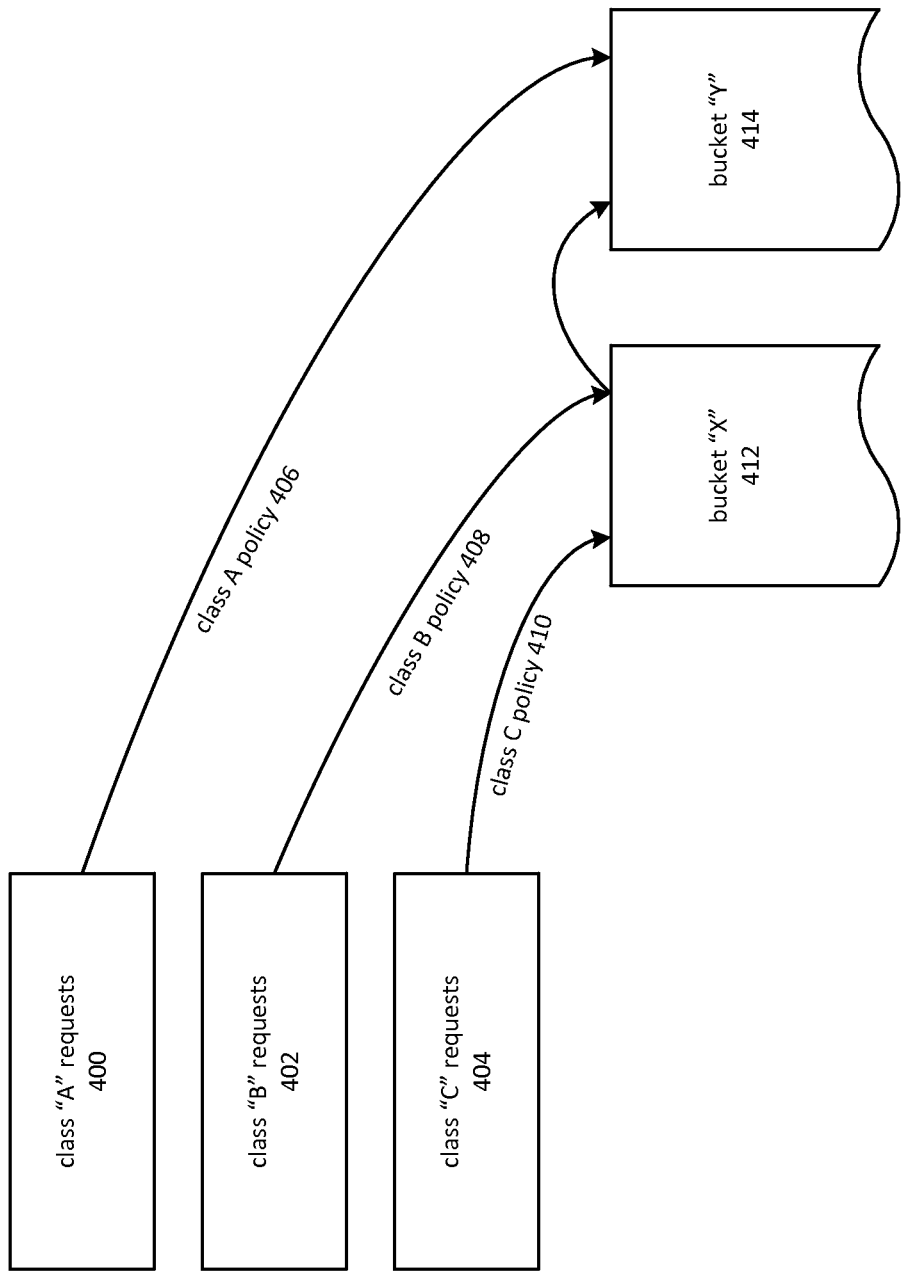

FIG. 4 depicts an embodiment for allocating capacity based on request classes and admittance policies. Incoming requests may be classified as belonging to a class of requests, such as class "A" requests 400, class "B" requests 402 and class "C" requests 404. An admittance policy may then be applied to determine which buckets are involved in admitting or rejecting the request and how tokens should be deducted from those buckets.

Each class of requests may be associated with an admittance policy. The policy may involve a variety of logical and procedural mechanisms related to the use of tokens. One aspect of an admittance policy involves determining whether or not a request should be admitted for processing. Using FIG. 4 as an example, a policy 406 might specify that class "A" requests 400 should be admitted if at least one token is available in bucket "Y" 414. A second policy 408 might specify that class "B" requests should be admitted if a token exists in either bucket "X" 412 or bucket "Y" 414. A third policy 410 for class "C" requests 404 might indicate that requests should be admitted based on bucket "X" 412 alone. These examples are illustrative and many other combinations are possible.

In an embodiment, a request may be admitted based on a variable or predefined token threshold. One example involves admitting requests only when a bucket has a number of tokens equal to a predicted number of tokens that might be consumed. Another example involves using a moving average of previous costs to set the minimum number of tokens. Numerous additional embodiments are possible.

Admittance policy may also involve determining how tokens are deducted. When a request is first admitted, one or more tokens may be deducted from the bucket upon which the admittance was based. However, the total cost of the request may not be known until the request has been at least partially processed. Therefore, at some time after a request has been admitted, a second token deduction may occur. The policy may specify one or more buckets as the target of the deduction, and may also specify a distribution between the buckets.

In an embodiment, tokens may be withdrawn from the same bucket that determined the admittance. For example, if a request were admitted based on the presence of a token in bucket "X" 412, depicted in FIG. 4, the full token cost could also be deducted from bucket "X" 412. One reason to employ this approach is that otherwise a bucket having negative available tokens could fall further behind, prolonging a blackout period for requests that rely exclusively on that bucket.

Another embodiment deducts first from the bucket that determined the admittance, and then from one or more subsequent buckets. For example, if a request was allowed based on an available token in bucket "X" 412, a portion of the total cost, once determined, could be deducted from bucket "X" 412 and a portion from bucket "Y" 414. The amount deducted from the first bucket 412, may be determined to prevent the available token count from falling below a threshold value such as zero. The remainder may be deducted from the second bucket or the last bucket in a series of buckets, possibly causing that bucket's available token count to fall below zero. Thus in FIG. 4, using this approach to process class "B" requests 402 could cause the available token count for bucket "Y" 414 to become negative. The count for bucket "X" 412, however, would not become negative due to class "B" requests 402. This approach might be advantageous because it could prevent blackout periods for class "C" requests 404 that could otherwise be caused by processing class "B" requests 402.

Figure 5:
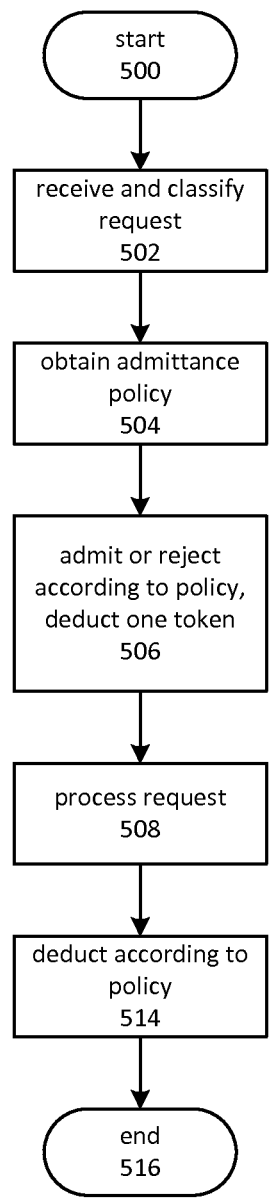
FIG. 5 is a flow chart depicting an embodiment for obtaining and applying an admittance policy based on a classification of a request.

FIG. 5 depicts an embodiment for obtaining and applying an admittance policy. Although depicted as a sequence of operations beginning with operation 500 and ending with operation 516, those of ordinary skill in the art will appreciate that the depicted operations are intended to be illustrative, and that at least some of the depicted operations may be altered, omitted, reordered or performed in parallel.

A process for applying an admittance policy may involve receiving a request as depicted by operation 502. The class to which the request belongs may then be determined. This may be done through a variety of means. In an embodiment, the API associated with a request invocation may allow for one or more parameters that identify the class. One example involves a textual parameter that names the class that the request corresponds to. However, it may be advantageous to use numerical values to identify a request class because of various performance considerations.

In some embodiments, requests may be classified based on their type. For example, write requests may be classified separately from read requests. Other embodiments might analyze requests to determine their potential costs and assign requests with similar cost levels to the same class.

Request class may be based on factors in addition to or instead of those specified in request parameters. For example, a given customer, identifier or security role might be associated with a request class. The customer or role might be available from the context in which a request was invoked, or it might be specified as a parameter in the request. Other potential factors include the source internet protocol address of the request, the particular API being invoked and so forth. In addition, configuration or other mechanisms may be used to define classification rules. For example, a configuration associated with a customer, a web service, an API or other entity might be associated with a request. Various default rules, possibly specified in the configuration, might also apply. A default value might be applied when no other classification rule is applicable. Embodiments may allow default values to be overridden. Embodiments may also allow for certain default values to be fixed, so that they cannot be overridden.

Once the class of the request has been determined, a corresponding admittance policy may be received, obtained or otherwise readied for application as depicted by operation 504. This may involve accessing a record that describes the admittance policy, such as a list of buckets from which tokens may be withdrawn. The record might, for example, be stored in a database, embedded in a code resource, configuration file and so forth. In some embodiments, structures representing the buckets may be part of the policy description, or in other words the buckets and the policy definition may comprise an integrated structure. Some embodiments may omit this step and apply policy by selecting an appropriate path of execution in the instructions that perform the various techniques described herein.

The request may be admitted or rejected by operation 506. The admittance policy may describe one or more buckets which will be checked for an available token. Some embodiments may require multiple tokens or base admittance on tokens being at least above a threshold level. Some embodiments may allow a request to be admitted when the token count is negative, and the policy description might indicate a threshold negative value below which requests should not be admitted.

Operation 506 may also involve deducting at least one token. The number of tokens deducted may be same amount of tokens that was used to determine whether or not the request should be admitted. In this way, another request will not be admitted based on the same token or set of tokens. Embodiments may also synchronize access to the buckets in order to prevent multiple requests from being admitted based on the same token or set of tokens.

After being admitted, the request may be processed as depicted by operation 508. The total cost of the request may be determined based at least in part on processing the request. In various embodiments, the size of data returned to the client of the service may be used. For example, if the request was a database query, a token cost could be derived from the total size of the data returned to the client after executing the query. In other embodiments, various performance metrics might be collected while the request is processed and used as a basis of a cost determination.

Various embodiments may deduct the cost of the operation once the request has been performed. This step may be performed in compliance with the admittance policy, as depicted by operation 514. The admittance policy may describe various approaches to deducting the token cost, such as distributing among multiple buckets or deducting the cost from the bucket that determined the admittance. Various other policies may be employed.

Figure 6A:
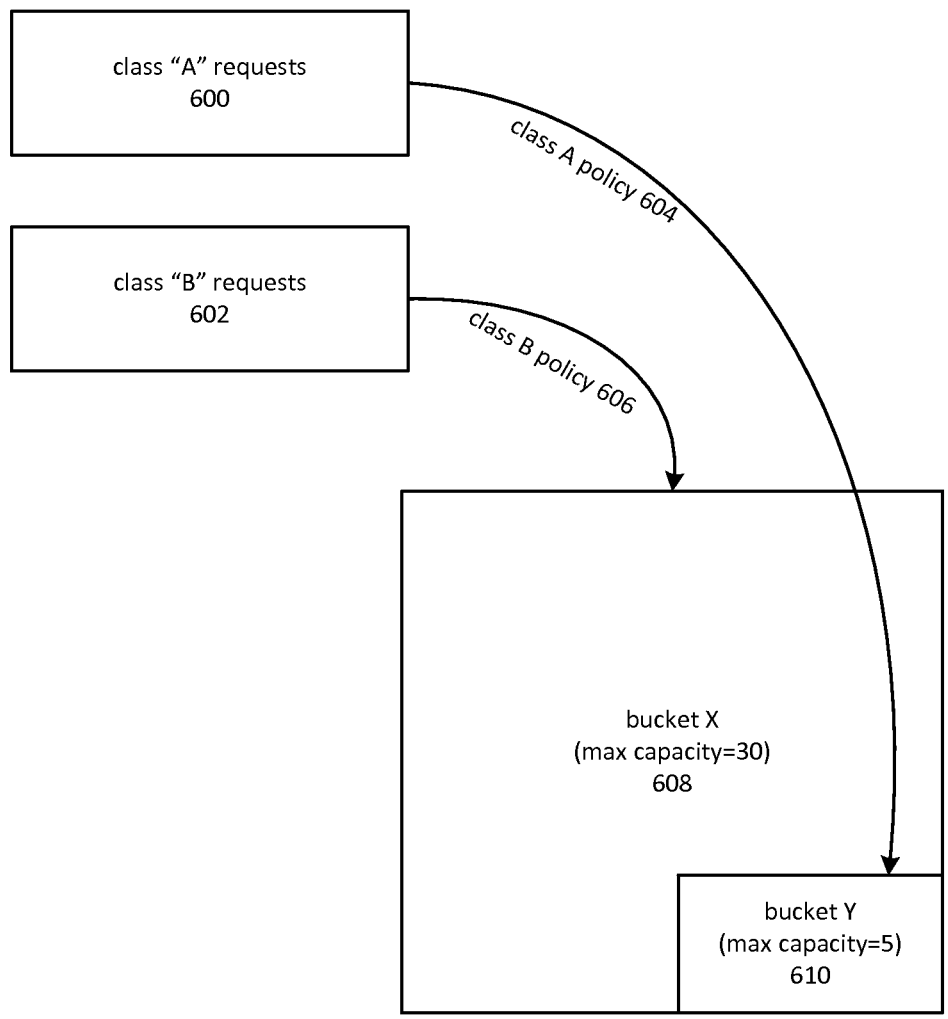
FIG. 6A is a diagram depicting dividing request types into a plurality of request classes and associating the classes with admittance policies that govern request admittance and token withdrawal from a hierarchical arrangement of token buckets.

In some embodiments token buckets may have a hierarchical relationship. This approach may allow for convenient administration of the selected admittance policy because it allows a prioritization scheme to be defined with a one-to-one mapping between request classes and token buckets. The hierarchical token buckets may be conveniently defined as by specifying parent-child relationships between token buckets along with respective maximum token capacities. FIG. 6A is illustrative of an embodiment employing an example of hierarchical token buckets. It depicts two token buckets. Bucket "X" 608 is a parent bucket of "Y" 610, and has a maximum capacity of thirty tokens. Bucket "Y" 610 is a child of parent "X" 608, and has a maximum capacity of five tokens. The tokens are shared between the buckets in hierarchical fashion, with a child bucket having access to all of its parent's tokens. Thus, when both token buckets 608 and 610 are at maximum capacity, there are 30 tokens to be shared between them.

In FIG. 6A class "A" requests 600 are associated with Bucket "Y" 610 based on application of class "A" policy 604. Similarly, class "B" requests are associated with Bucket "X" 608 based on class B policy 606. Admittance policies may comprise a one-to-one mapping between a request class and a bucket which may be used to determine whether or not to admit a request and from which token bucket, or buckets, the tokens are withdrawn. An admittance policy may also comprise additional elements such as the minimum number of available tokens needed to admit a request. Various methods and techniques described herein regarding non-hierarchical approaches may also be applied to hierarchical approaches.

A request may be admitted based on the availability of at least one token in the token bucket that is mapped to the request's class. For example, class "A" requests 600 may be admitted when Bucket "Y" 610 has an available token. Similarly, class "B" requests 602 may be admitted when Bucket "X" 608 has an available token. Some embodiments may require that more than one token be available, based for example on an estimated cost of processing the request.

The token or tokens required for admittance may be deducted when the request is admitted for processing. Embodiments may deduct one token upon admitting the request. The remaining cost, once known, may be deducted from the same bucket that determined admittance.

Figure 6B:
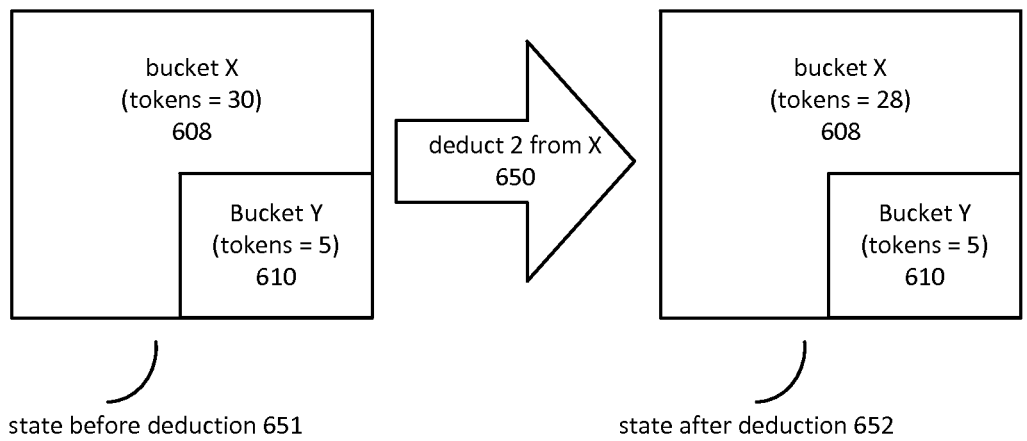
FIG. 6B is a diagram depicting deducting tokens from a parent bucket in a hierarchical arrangement of token buckets.

FIG. 6B is a diagram depicting an operation 650 deducting two tokens from Bucket "X" 608. The pre-deduction state of Buckets "X" 608 and "Y" 610 is depicted by figure element 651, and the post-deduction state by element 652. The tokens are deducted from Bucket "X" 608 to result in a token count of twenty-eight. The tokens available to "Y" 610 remain unchanged.

Figure 6C:
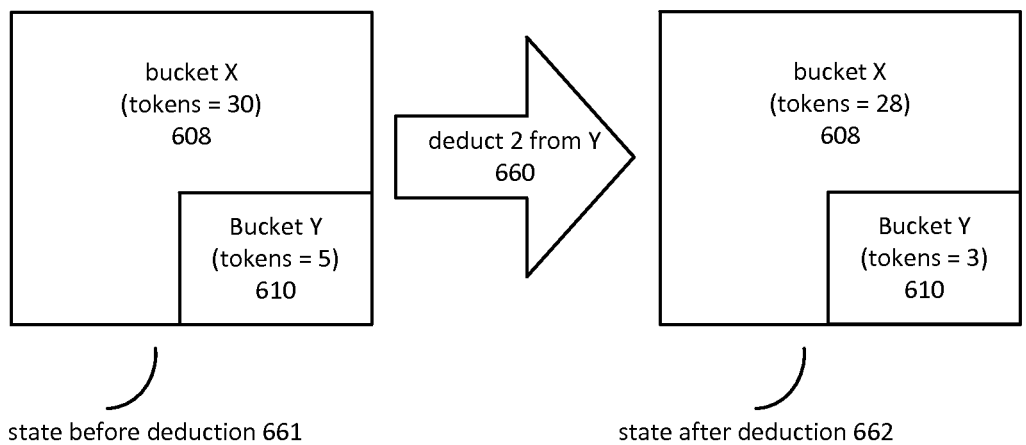
FIG. 6C is a diagram depicting deducting token buckets from a child bucket in a hierarchical arrangement of token buckets.

In FIG. 6C, operation 660 depicts deducting two tokens from Bucket "Y" 610. The state before deduction is depicted by figure element 661. The state after the deduction, as depicted by element 662 shows that the tokens available to both Bucket "X" 608 and "Y" 610 have been reduced by two. This approach reflects sharing available tokens between the two buckets in a hierarchical fashion. When a request is admitted or processed on the basis of tokens being available in a child bucket, the tokens may be withdrawn from the child bucket and each of its parents. In addition, various embodiments may require that, in order for a request to be admitted, a token must be available in both the child bucket and in each of its parents. In FIG. 6C, a request could be admitted on the basis of state before deduction 661, because both Bucket "Y" 610 and its parent Bucket "X" 608 have at least one token. On the other hand, embodiments may permit a parent bucket, such as Bucket "X" 608, to process requests even if there are insufficient tokens in a child bucket.

Figure 6D:
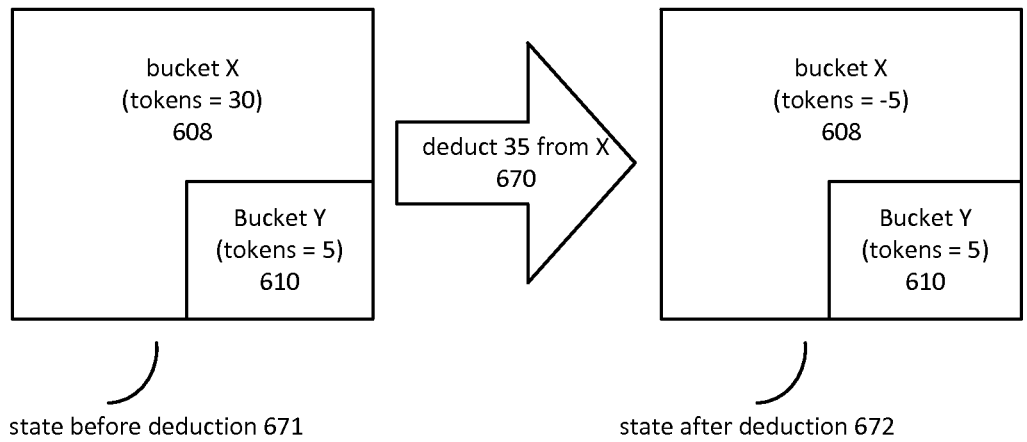
FIG. 6D is a diagram depicting deducting, from a parent bucket, more tokens than are available to the parent.

Operation 670 in FIG. 6D depicts deducting from Bucket "X" 608 a quantity of tokens that is more than the number available. Before the deduction, as depicted by element 671, token Bucket "X" 608 has thirty tokens available to it. After deducting thirty-five tokens, as depicted by state after deduction 672, its total has been reduced to negative five. FIG. 6D depicts Bucket "Y" 610 as having five tokens available to it after the deduction. For requests whose admittance depends upon bucket "Y" 610, embodiments may require at least one token to be present in parent bucket "X" 608. Accordingly, in these embodiments no requests dependent on Bucket "Y" 610 would be admitted until the number of tokens available to both Bucket "X" 608 and Bucket "Y" 610 rises above zero. However, embodiments may not reduce the number of tokens in a child bucket when tokens are deducted from its parents. Embodiments may still require at least one token to be present in each of the child bucket's parents. However, preventing the child's token count from going negative may help to prevent blackout periods for services associated with the child bucket.

Factors may determine the length of a blackout period include the degree to which token counts in a child bucket and its parents are negative, and the child and parent buckets respective refill rates. For example, in FIG. 6D, a request dependent on Bucket "Y" 610 may not be admitted until at least one token is available in both Bucket "X" 608 and Bucket "Y" 610. The rate at which Bucket "X" 608 refills with tokens may therefore influence the length of blackout periods seen with requests dependent on Bucket "Y" 610. Bucket "X" 608 may, however, be assigned an accumulation rate that is proportionally higher than that assigned to Bucket "Y" 610.

Figure 6E:
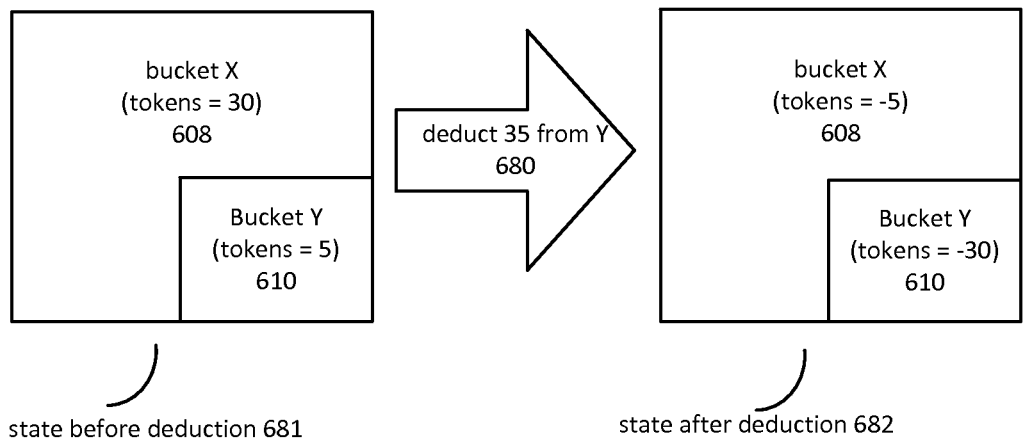
FIG. 6E is a diagram depicting deducting, from a child bucket, more tokens than are available to either the child bucket or the parent bucket.

FIG. 6E depicts operation 680 deducting more tokens from Bucket "Y" 610 than are available to it. Before the deduction, Bucket "Y" 610 has five tokens available to it, as depicted the portion of the figure at element 681. After deducting thirty-five tokens, Bucket "Y" 610 has negative thirty tokens available to it, while Bucket "X" 608 is left with negative five tokens. This state, depicted by element 682, reflects deducting from child Bucket "Y" 610 upon which admittance is based, and from its parent Bucket "X" 608.

Embodiments of hierarchical token buckets may employ a variety of techniques, algorithms, data structures and so forth. In an embodiment, a record may be used to track the number of tokens available to a parent token bucket. The number of tokens available to its children may then be determined based on a set of rules, an algorithm and so forth. For example, the number of tokens available a child token bucket may be determined based on the number of tokens available to the parent token bucket and the maximum number of tokens the child token bucket is allowed to accumulate.

A hierarchy of token buckets may accumulate new tokens as a group. Using the token buckets depicted in FIG. 6A as a point of reference, a token accumulation rate may be associated with the hierarchy that includes Buckets "X" 608 and "Y" 610. When tokens are added to the hierarchy, the number of tokens available to both Buckets "X" 608 and "Y" 610 may increase up to their respective maximums.

Figure 6F:
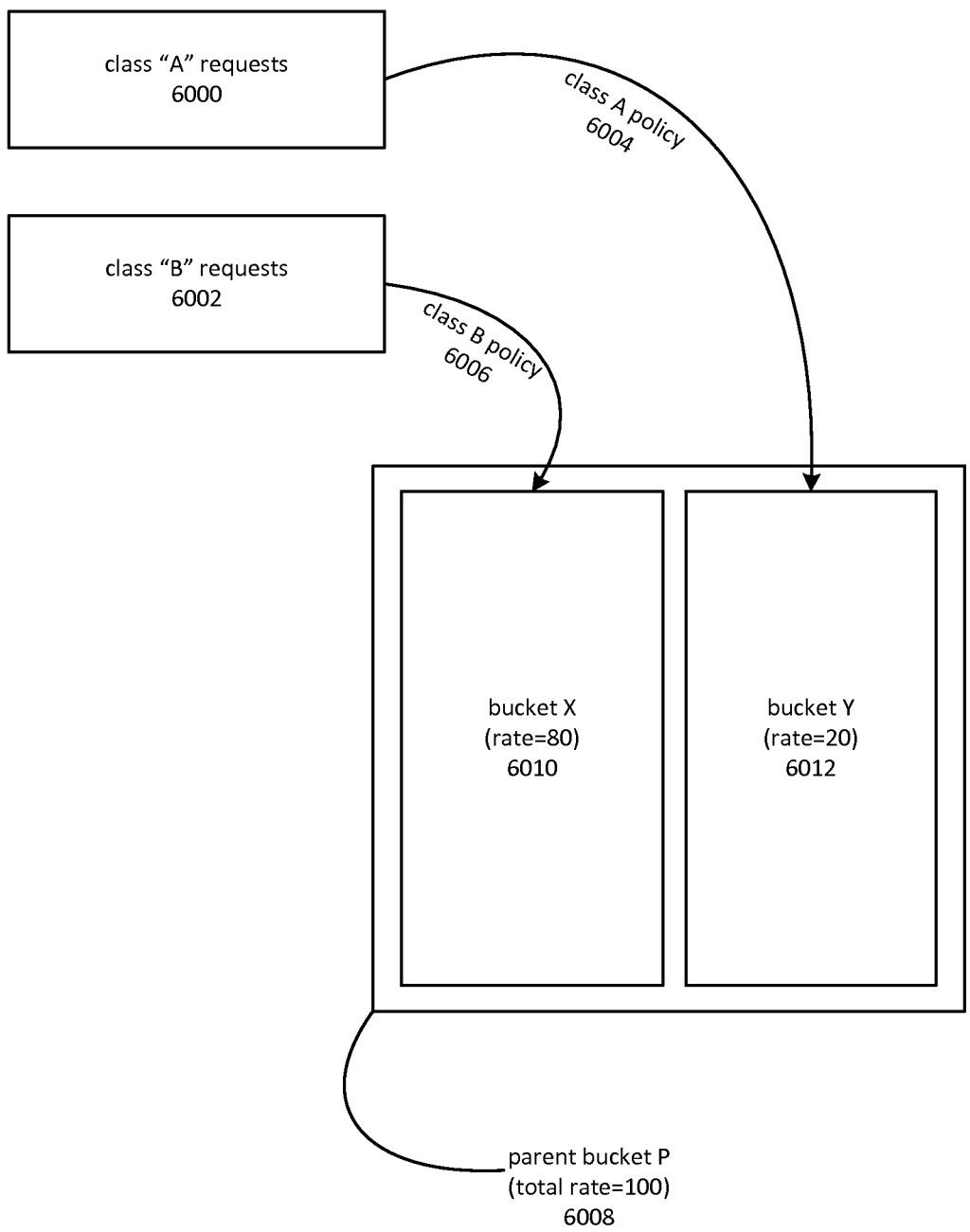
FIG. 6F is a diagram depicting a hierarchical arrangement of token buckets where two or more classes of equal priority share a parent bucket.

FIG. 6F depicts a hierarchical arrangement of token buckets in which two or more request classes share buckets having equal priority. Class "A" requests 6000 may be directed to Bucket "X" 6010, and class "B" requests 6002 may be directed to Bucket "Y" 6012. Parent Bucket "P" 6008 may have a total capacity of 100, corresponding to Bucket "X" 6010 receiving an allocation of 80 tokens per second and Bucket "Y" 6012 receiving an allocation of 20 tokens per second. The maximum capacity of the buckets may be the same as their respective rates of token allocation.

An admission policy may be defined for the arrangement depicted in FIG. 6F in which the child buckets share equal priority. The admission policy may proceed as follows: Upon the arrival of a request corresponding to class "A" requests 6000, bucket "Y" 6012 may be consulted for token availability. If at least one token is available, the request may be admitted. The count of available tokens in bucket "Y" 6012 and Parent Bucket "P" may each be reduced upon admittance and again upon processing the request. If insufficient tokens are available in Bucket "Y" 6012, the request may be admitted if there is at least one token in Parent Bucket "P" 6008. A token may be deducted from Parent Bucket "P" 6008 upon admittance and again upon processing the request. Class "B" requests 6002 may be processed in a similar manner by defining class "B" policy 6006 in a manner similar to class "A" policy 6004, adjusting for differences in token allocation rates.

A consequence of this approach involves requests from each class having access to their provisioned capacity, but able to draw on additional capacity if the sibling bucket is underutilizing the capacity provisioned to it. For example, if only class "A" requests 6000 are issued, there will be up to 100 tokens per second available for processing them. If the workload is mixed and class "A" requests 6000 consume ten tokens per second, then class "B" requests 6002 will be able to consume up to 90 tokens per second.

Aspects of the admittance policy may be defined by a customer of a hosting provider. The definition may be performed by the customer's interaction with a user interface provided by the service provider. For example, a web page might allow the user to define the classes and the respective buckets from which tokens may be withdrawn. The user might also set various additional parameters, such as a minimum token amount for requests in each class.

Figure 7A:
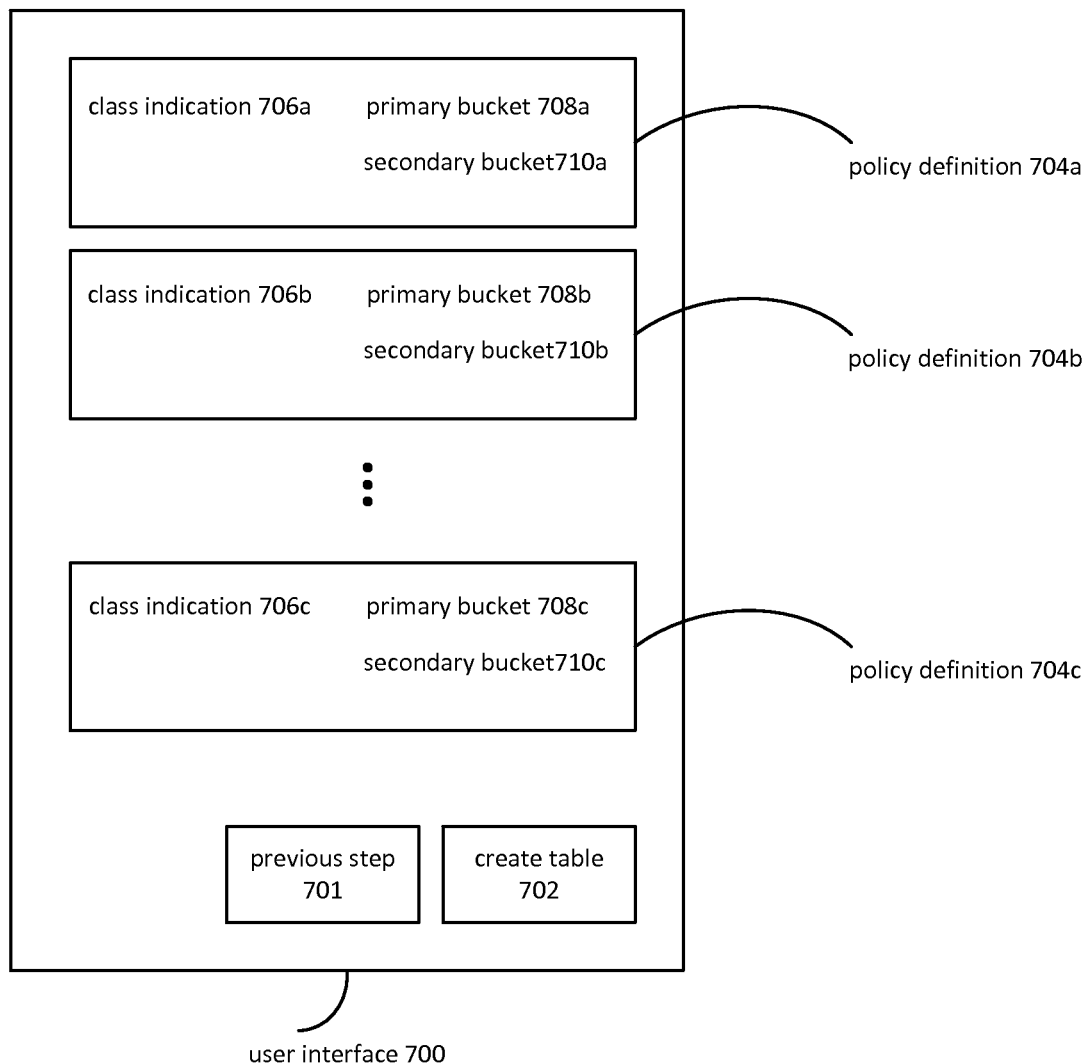
FIG. 7A is a diagram depicting an illustrative example of a user interface for obtaining customer-provided information pertaining to request classes, token buckets, and admittance policies.

Various embodiments may provide means for administering the policies that govern input/output prioritization, which may for example include defining request classes, token buckets, admittance policies and so forth. In FIG. 7A, user interface 700 may comprise part of a sequence of user interface pages presented to a user during creation of a hosted database table. The previous step 701 user interface component may represent a button, hyperlink or similar element for navigating to a previous point in a user interface wizard for defining a hosted database table. The create table 702 user interface element may indicate that the user has finished supplying parameters to the table creation process and that a table should be created. The depicted user interface elements are intended to be generalized examples of an approach to providing such an interface, and should not be construed as limiting the scope of the present disclosure.

User interface 700 may contain one or more policy definitions 704a, 704b and 704c, which may be used to supply parameters indicative of the relationship between a class of request and one or more buckets from which tokens may be withdrawn, and possibly other various elements of an admittance policy. For example, policy definition element 704a may comprise a class indication 706a, primary bucket indication 708a, and secondary bucket indication 710a. The class indication 706a may comprise various parameters that describe a class, which may include a class name and one or more request types. In some embodiments, the request classes and request types are pre-defined by the hosting service provider. A number of additional class indications may be presented in user interface 700, such as policy definition 704b comprising class indication 706b, primary bucket indication 708b and secondary bucket indication 710b, and policy definition 704c comprising class indication 706c, primary bucket indication 708c and secondary bucket indication 710c.

Primary bucket element 708a and secondary bucket element 710a indicate the token buckets that comprise part of the admittance policy, as well as their respective priorities. For example, the token bucket indicated by 708a would be consulted first in applying admittance decisions for requests that fall into the class specified by class indication 706a. The token bucket specified by secondary token bucket 710a would be consulted second. Policy definitions 704a, 704b and 704c may refer to the same token buckets, or to overlapping sets of token buckets.

Figure 7B:
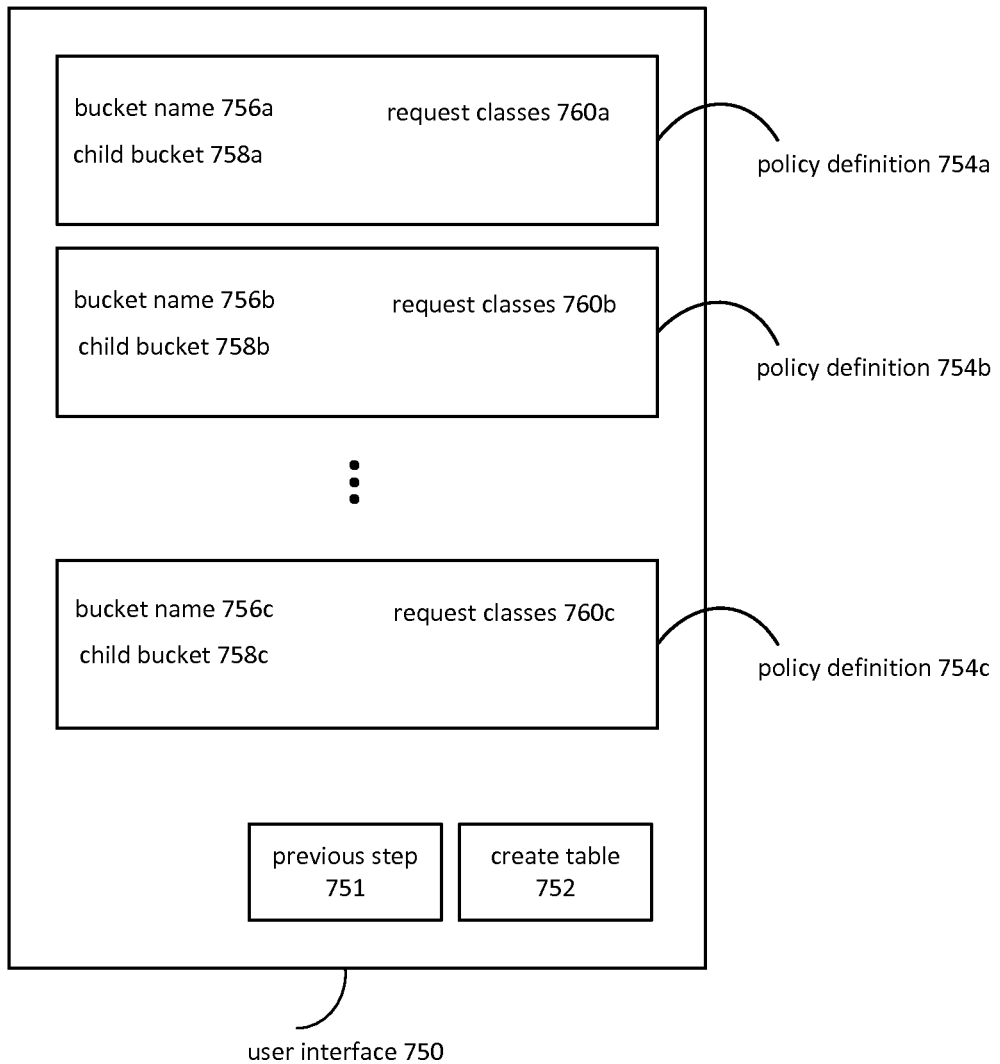
FIG. 7B is a diagram depicting an illustrative example of a user interface for obtaining customer-provided information pertaining to request classes, token buckets, and admittance policies, adapted for an approach that utilizes a hierarchical token-bucket model.

FIG. 7B depicts an illustrative embodiment of a user interface for defining admittance policies employing hierarchical token buckets. User interface 750 may comprise part of a table definition process that employs previous step 751 and create table 752 user interface elements to navigate to other steps in the process and to indicate that the process should be completed.

User interface 750 may comprise one or more policy definitions 754a, 754b and 754c that allow the customer to supply parameters for creating admittance policies and hierarchical token buckets. For example, policy definition 754a might include a bucket name 756a user interface element indicative of the name of a token bucket. In some embodiments this may be a drop box or other user interface element containing predefined bucket names. Request classes 760a might comprise combo box, list box or other user interface element allowing request classes to be assigned to the bucket indicated by bucket name 756a. The child token bucket 758a user interface element might be used to specify one or more child token buckets, such as Bucket "Y" 610 depicted in FIG. 6A.

This may be a list box or other user interface element allowing one or more children token buckets to be selected. In some embodiments, the parent token bucket might be specified in place of one or more child token buckets. User interface 750 may allow for a number of additional policy definitions to be defined. For example, user interface 750 also contains user interface elements for defining or editing policy definition 754b, which comprises bucket name 756b, request classes 760b and child bucket 758b, and policy definition 754c, which comprises bucket name 756c, request classes 760c and child bucket 758c.

Both FIGS. 7A and 7B are depicted as providing user interface elements for specifying a token bucket, such as primary bucket 708a in FIG. 7A and bucket name 756a in FIG. 7B. However, user interfaces 700 and 750 may use alternative representations for directly or indirectly specifying a token bucket and corresponding request classes. For example, user interface 700 might present a choice of high, medium or low priority that could be associated with a request class. The relationships between buckets could be inferred from the priority level selected by a user. A similar approach could be employed in user interface 750.

Embodiments may employ user interfaces similar to those depicted in FIGS. 7A and 7B to allow customers to subsequently edit request classes, buckets, relationships between buckets and so forth. One example involves changing the definition of a table. A customer might make various modifications to the definition of a database table, for example by adding additional columns. The modified table might be associated with a different usage pattern. Accordingly, the customer might also specify a change in the capacity allocated to the table, the admittance policy, the number of buckets and so forth. Various user interface elements or APIs might be used to supply the relevant information.

The example user interfaces depicted in FIGS. 7A and 7B may be implemented using a wide variety of technologies, including thick-client, n-tier or other architectures. In an embodiment, a web server operating in a hosting provider's data center serves hypertext markup language ("HTML") forms to a customer's browser. Upon submitting the forms, a web service API within a hosting provider data center receives and processes the information supplied by the customer.

Figure 8:
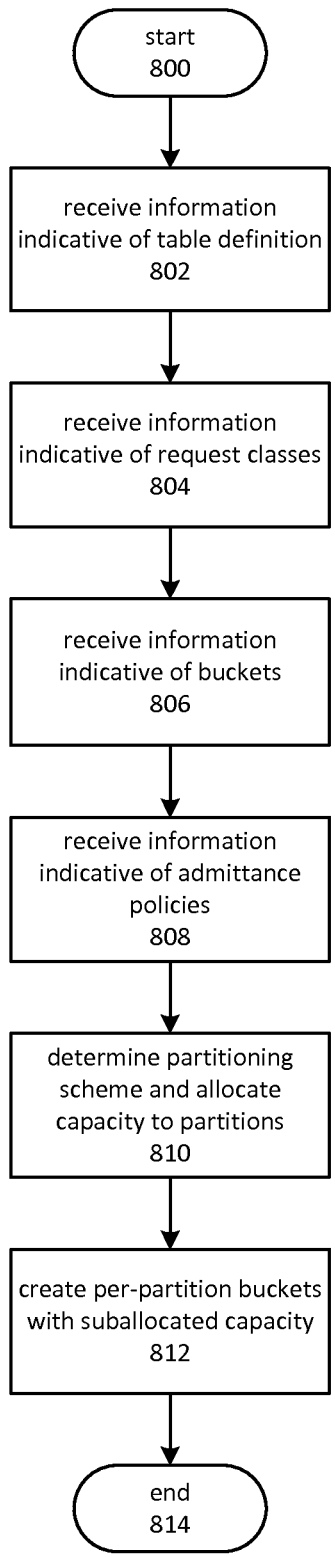
FIG. 8 is a flowchart depicting steps for receiving capacity allocation and admittance policy information in conjunction with a customer's definition of a new table, and using the information to create token buckets and apply admittance policy on a per-partition basis.

FIG. 8 is a flowchart depicting a process for creating a database table with associated token buckets and admittance policies. Although depicted as a sequence of operations starting with operation 800 and ending with operation 814, it will be appreciated by those of ordinary skill in the art that at least some of the depicted operations may be altered, omitted, reordered or performed in parallel. For example, the information indicated by operations 802-808 may be received concurrently at the hosting provider data center.

Operation 802 depicts receiving information indicative of a table definition. Embodiments of the present disclosure may allocate capacity on a per-table basis or on a per-partition basis if the defined table involves more than one partition. A partition may comprise a subdivision of a table, each of which may be maintained by a DBMS operating on one or more computing nodes. Because capacity may be allocated on a per-table or per-partition basis, admittance policies and token buckets may be defined on a similar basis.

Operation 804 depicts receiving information indicative of one or more classes of requests. These classes may be defined by the user, for example through a user interface such as those depicted in FIGS. 7A and 7B. In other embodiments, the hosting provider may predefine the request classes. In an embodiment, the request classes are labeled as "high," "medium" and "low."

Operation 806 depicts receiving information indicative of the buckets that should be created. In some embodiments the information may comprise a listing or count of the buckets to be created, while in others the information may be inferred. For example, a one-to-one correspondence between request classes and token buckets may be inferred. In an embodiment, three token buckets may be created to correspond to the "high," "medium" and "low" request classes.

At operation 808, information indicative of one or more admittance policies may be received. This information may comprise a mapping between request classes and buckets, and may include information indicative of the order in which buckets should be consulted to determine admittance, a method of deducting tokens and so forth. The information may be combined with other information referred to by operations 802-806. Certain aspects of the information may be determined inferentially, or be used to infer other aspects of the information received in operations 802-806. For example, in some embodiments a policy description that references a bucket may be used to infer that the referenced bucket should be created.

At operation 810, a partitioning scheme may be determined. The table or other service to be hosted may be divided among multiple computing nodes. Accordingly, embodiments may determine how many and which computing nodes to involve, as well as other aspects of partitioning the table such as determining how to divide the data maintained by the table. For services not involving tables, this may involve determining how to divide the workloads handled by the respective partitions.

Based on the partitioning scheme, capacity may be allocated to the various partitions or computing nodes. Per-customer capacity may, for example, be divided evenly between the partitions or it may be divided based on the amount of workload a partition or computing node is expected to handle. For example, if a first partition is expected to handle three-fourths of a table's workload, it may be allocated three-fourths of the capacity.

Allocating per-customer capacity to a partition may involve assigning a proportion of a total amount of token generation to a partition. For example, it may be determined based at least in part on a customer's service tier that he should be allocated a given quantity of tokens per second. Continuing the previous example, three-fourths of that capacity could be allocated to one partition or computing node and the remaining one-fourth to another. This is depicted by operation 810.

The total per-customer capacity assigned to a partition may be suballocated to the token buckets to be created on that partition, as depicted by operation 812. Continuing the previous example, if three-fourths of the total capacity corresponded to token generation at a rate of seventy-five tokens per second, then a total of seventy-five tokens per second could be allocated to the token buckets associated with that partition or computing node. If there were three token buckets for that partition, then each could be allocated twenty-five tokens per second.

Once determined, the per-bucket token allocation rate may be used to create, initialize or otherwise represent a token bucket. In various embodiments, creating a bucket may comprise initializing various data structures, such as a record comprising a maximum token capacity, a current capacity, a token allocation rate and a last addition time. Numerous other embodiments are possible. For example, in some embodiments there may not be a one-to-one correspondence between logically defined buckets and data structures stored in memory.

The operations depicted in FIG. 8 may also be adapted to allow for updates. For example, operation 802 could comprise receiving information indicative of a change to the definition of an existing table. In addition, information pertaining to request classes, bucket definitions and relationships, admittance policies, partitioning scheme and so forth can be received subsequent to their initial definition, and the corresponding entities and relationships updated accordingly.

Figure 9:
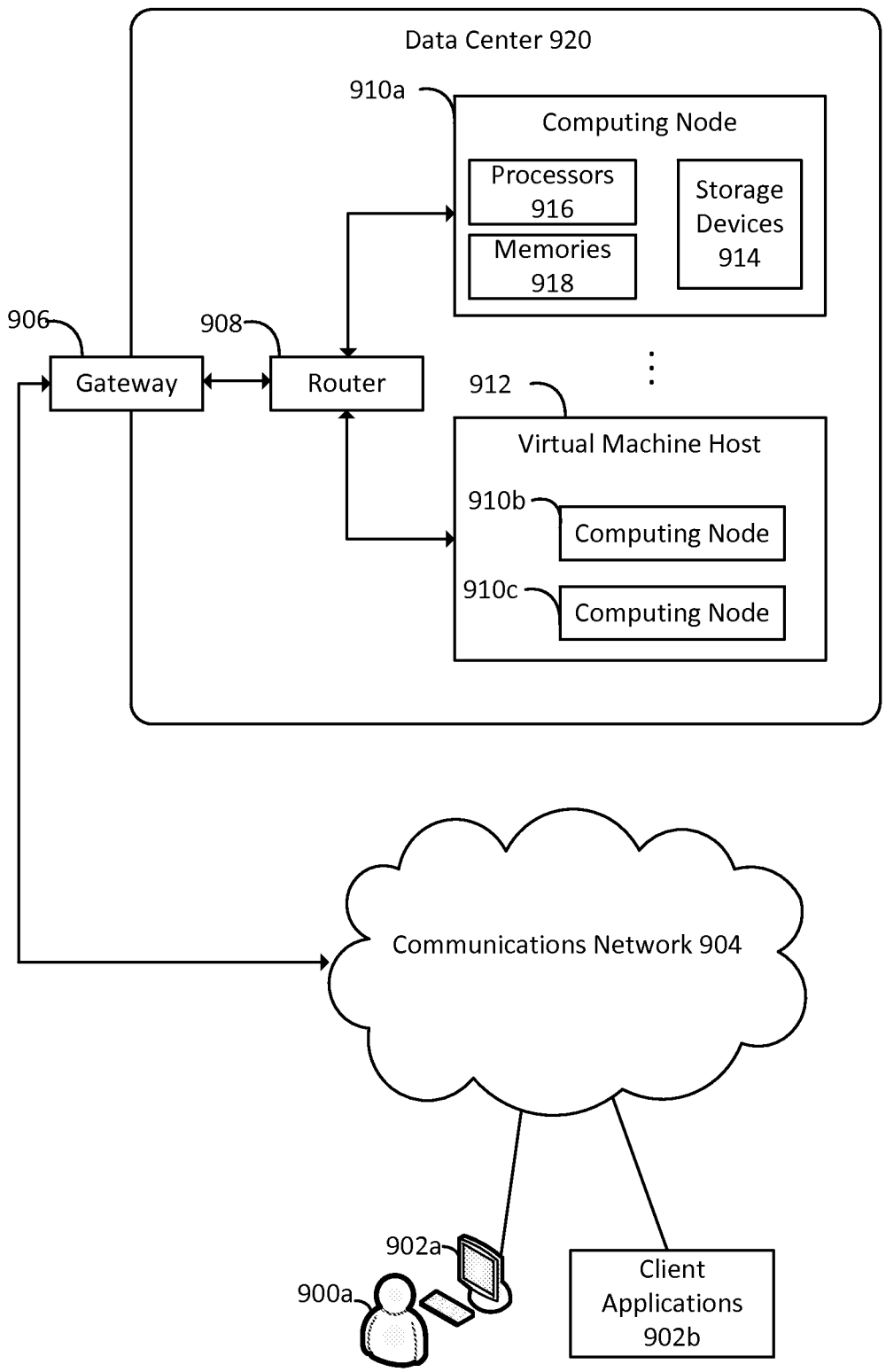
FIG. 9 is a block diagram depicting an embodiment of a computing environment in which aspects of the present disclosure may be practiced.

FIG. 9 is a diagram depicting an example of a distributed computing environment on which aspects of the present invention may be practiced. Various users 900a may interact with various client applications, operating on any type of computing device 902a, to communicate over communications network 904 with processes executing on various computing nodes 910a, 910b and 910c within a data center 920. Alternatively, client applications 902b may communicate without user intervention. Communications network 904 may comprise any combination of communications technology, including the Internet, wired and wireless local area networks, fiber optic networks, satellite communications and so forth. Any number of networking protocols may be employed.

Communication with processes executing on the computing nodes 910a, 910b and 910c, operating within data center 920, may be provided via gateway 906 and router 908. Numerous other network configurations may also be employed. Although not explicitly depicted in FIG. 9, various authentication mechanisms, web service layers, business objects or other intermediate layers may be provided to mediate communication with the processes executing on computing nodes 910a, 910b and 910c. Some of these intermediate layers may themselves comprise processes executing on one or more of the computing nodes. Computing nodes 910a, 910b and 910c, and processes executing thereon, may also communicate with each other via router 908. Alternatively, separate communication paths may be employed. In some embodiments, data center 920 may be configured to communicate with additional data centers, such that the computing nodes and processes executing thereon may communicate with computing nodes and processes operating within other data centers.

Computing node 910a is depicted as residing on physical hardware comprising one or more processors 916, one or more memories 918 and one or more storage devices 914. Processes on computing node 910a may execute in conjunction with an operating system or alternatively may execute as a bare-metal process that directly interacts with physical resources such as processors 916, memories 918 or storage devices 914.

Computing nodes 910b and 910c are depicted as operating on virtual machine host 912, which may provide shared access to various physical resources such as physical processors, memory and storage devices. Any number of virtualization mechanisms might be employed to host the computing nodes.

The various computing nodes depicted in FIG. 9 may be configured to host web services, database management systems, business objects, monitoring and diagnostic facilities, and so forth. A computing node may refer to various types of computing resources, such as personal computers, servers, clustered computing devices and so forth. When implemented in hardware form, computing nodes are generally associated with one or more memories configured to store computer-readable instructions, and one or more processors configured to read and execute the instructions. A hardware-based computing node may also comprise one or more storage devices, network interfaces, communications buses, user interface devices and so forth. Computing nodes also encompass virtualized computing resources, such as virtual machines implemented with or without a hypervisor, virtualized bare-metal environments, and so forth. A virtualization-based computing node made have virtualized access to hardware resources, as well as non-virtualized access. The computing node may be configured to execute an operating system, as well as one or more application programs. In some embodiments, a computing node might also comprise bare-metal application programs.

Each of the processes, methods and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions of thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system for prioritizing capacity consumption of a database management system, the system comprising:
   one or more computing nodes configured to operate the database management system; and
   one or more memories having stored thereon computer readable instructions that, upon execution, cause the system at least to:
      receive a request to perform an operation on the database management system, the request comprising information indicative of a request class, the operation to be performed on behalf of a customer;
      select a first token bucket from one or more data structures comprising a plurality of token buckets, the selection based at least in part on the request class, the first token bucket having an associated first capacity indicator, the first token bucket associated with a second token bucket of the plurality of token buckets;
      determine that the first capacity indicator is indicative of a capacity to perform the operation on behalf of the customer;
      perform the operation;
      update the first capacity indicator based at least in part on capacity utilized by performing the operation; and
      update a second capacity indicator associated with the second token bucket, based at least in part on the capacity utilized by performing the operation.

2. The system of claim 1, further comprising one or more memories having stored thereon computer readable instructions that, upon execution by a computing device, cause the system at least to:
   receive information indicative of an association between the request class and the first token bucket.

3. The system of claim 1, further comprising one or more memories having stored thereon computer readable instructions that, upon execution by a computing device, cause the system at least to:
   determine that a second capacity indicator associated with the second token bucket of the plurality of token buckets is indicative of a lack of capacity to perform the operation on behalf of the customer.

4. The system of claim 1, wherein the second capacity indicator is updated when the first capacity indicator is indicative of a lack of capacity to perform the operation.

5. The system of claim 1, wherein the second capacity indicator is updated when the first capacity indicator is updated.

6. A computer-implemented method for prioritizing capacity consumption comprising:
   receiving a request to perform an operation on one or more computing nodes, the request comprising information indicative of a request class, the operation to be performed on behalf of a customer;
   selecting, based at least in part on the request class, a first data structure from a plurality of data structures, wherein the first data structure comprises a first capacity indicator, the first data structure associated with a second data structure comprising a second capacity indicator;
   determining that the first capacity indicator is indicative of a capacity of the one or more computing nodes to perform the operation on behalf of the customer;
   performing the operation; and
   updating the first capacity indicator and the second capacity indicator based at least in part on capacity utilized performing the operation.

7. The method of claim 6, wherein the operation is performed on one or more of a web service, web site, and database management system.

8. The method of claim 6, wherein the information indicative of the request class comprises a parameter.

9. The method of claim 6, wherein the information indicative of the request class comprises a configuration value.

10. The method of claim 6, further comprising associating the request class with one or more of a customer identifier, security role, and application programming interface.

11. The method of claim 6, further comprising:
   receiving information indicative of a mapping between the request class and the first capacity indicator.

12. The method of claim 6, further comprising:
   determining that the second capacity indicator from the plurality of data structures is indicative of a lack of capacity to perform the operation on behalf of the customer.

13. The method of claim 6, wherein the first capacity indicator and one or more additional capacity indicators from the plurality of data structures share one or more memory locations in the plurality of data structures indicative of capacity to perform the operation on behalf of the customer.

14. The method of claim 6, wherein the first capacity indicator corresponds to a subset of a total capacity of the one or more computing nodes.

15. The method of claim 6, wherein the first capacity indicator comprises a count of units of capacity available for performing operations on behalf of the customer.

16. The method of claim 15, where the count is increased based at least in part on a rate of allocated capacity accumulation.

17. A non-transitory computer-readable storage medium having stored thereon instructions that, upon execution by a computing device, cause the computing device to at least:
   receive a request to perform an operation on one or more computing nodes, the request comprising information indicative of a request class;
   select, based at least in part on the request class, a first data structure from a plurality of data structures, wherein the first data structure comprises a first capacity indicator and is associated with a second data structure comprising a second capacity indicator;
   determine that the first capacity indicator is indicative of sufficient capacity to admit the operation for processing;
   perform the operation; and
   update the first capacity indicator and the second capacity indicator based at least in part on capacity utilized to perform the operation.

18. The computer-readable storage medium of claim 17, wherein the information indicative of the request class comprises a parameter.

19. The computer-readable storage medium of claim 17, having stored thereon further instructions that, upon execution by the computing device, cause the computing device to at least:
   determine that the second capacity indicator from the plurality of data structures is indicative of a lack of capacity to perform the operation.

20. The computer-readable storage medium of claim 17, wherein the second capacity indicator is updated when the first capacity indicator is indicative of a lack of capacity to perform the operation.

21. The computer-readable storage medium of claim 17, wherein the first capacity indicator comprises a count of units of capacity available to perform the operation.

22. The computer-readable storage medium of claim 21, wherein the count is increased based at least in part on a rate of allocated capacity accumulation.

23. A system for prioritizing capacity consumption, the system comprising:
   one or more computing nodes; and
   one or more memories having stored thereon computer readable instructions that, upon execution by a computing device, cause the system at least to:
      receive information indicative of one or more requests classes;
      receive information indicative of a mapping between a first request class of the one or more request classes and a first capacity indicator, the first capacity indicator associated with a second capacity indicator;
      allocate a subset of total capacity to perform operations on one or more computing nodes to the first capacity indicator;
      perform an operation upon determining that the operation corresponds to the first request class and determining that the first capacity indicator is indicative of capacity available to perform the operation on the one or more computing nodes; and
      update the first capacity indicator and the second capacity indicator based at least in part on capacity utilized to perform the operation.

24. The system of claim 23, further comprising one or more memories having stored thereon computer readable instructions that, upon execution by a computing device, cause the system at least to:
   receive information indicative of instructions to create a database table on behalf of a customer.

25. The system of claim 24, further comprising one or more memories having stored thereon computer readable instructions that, upon execution by a computing device, cause the system at least to:
   determine the subset of total capacity based at least in part on a number of partitions of the database table.

26. The system of claim 23, further comprising one or more memories having stored thereon computer readable instructions that, upon execution by a computing device, cause the system at least to:
   receive information indicative of instructions to modify a database table; and
   receive information indicative of instructions to modify capacity allocated to the database table.

27. The system of claim 23, further comprising one or more memories having stored thereon computer readable instructions that, upon execution by a computing device, cause the system at least to:
   send user interface instructions comprising instructions for accepting customer input, the customer input comprising the information indicative of the mapping.

* * * * *